US012173696B2

(12) United States Patent
Voss et al.

(10) Patent No.: US 12,173,696 B2
(45) Date of Patent: Dec. 24, 2024

(54) WIND TURBINE HAVING EIGENFREQUENCY MODIFIER (71) Applicant: General Electric Renovables Espana, S.L., Barcelona (ES)

(72) Inventors: Stefan Bernhard Voss, Salzbergen (DE); Alexander Miller, Salzbergen (DE); Ulrich Uphues, Salzbergen (DE)

(73) Assignee: General Electric Renovables España S.L., Barcelona (ES)

( * ) Notice: Subject to any disclaimer, the term of this patent is extended or adjusted under 35 U.S.C. 154(b) by 33 days.

(21) Appl. No.: 17/738,135

(22) Filed: May 6, 2022

(65) Prior Publication Data

US 2022/0356924 A1 Nov. 10, 2022

(30) Foreign Application Priority Data

May 6, 2021 (EP) .................................... 21172525

(51) Int. Cl.
*F03D 80/80* (2016.01)
*F03D 7/02* (2006.01)
*F03D 13/20* (2016.01)
*F16F 7/10* (2006.01)

(52) U.S. Cl.
CPC ........... *F03D 80/80* (2016.05); *F03D 7/0296* (2013.01); *F03D 13/20* (2016.05); *F16F 7/10* (2013.01); *F05B 2260/96* (2013.01)

(58) Field of Classification Search
None
See application file for complete search history.

(56) References Cited

U.S. PATENT DOCUMENTS

| 7,931,438 B2* | 4/2011 | Schellings ................ F03D 1/00 415/4.3 |
| 7,980,814 B2* | 7/2011 | Nieuwenhuizen ...... F03D 13/20 415/118 |
| 8,322,975 B2* | 12/2012 | Kawabata ................. F16F 7/10 415/126 |
| 2008/0145222 A1* | 6/2008 | Schellings .............. F03D 80/00 416/31 |

(Continued)

FOREIGN PATENT DOCUMENTS

EP 1008747 A2 6/2000
EP 2644886 A2 10/2013

(Continued)

OTHER PUBLICATIONS

European Search Report Corresponding to EP21172525 on Nov. 3, 2021.

*Primary Examiner* — Juan G Flores
(74) *Attorney, Agent, or Firm* — Dority & Manning, P.A.

(57) ABSTRACT

It is provided a wind turbine having a modified eigenfrequency, the wind turbine having a tower including a first tower flange arranged at an upper end portion of a top part of the tower; and, an eigenfrequency modifier including a plurality of weights suspended from the first tower flange by a plurality of rigid supports. It is further provided a method of modifying an eigenfrequency of a wind turbine, the method including modifying the eigenfrequency of the wind turbine by suspending a plurality of weights from a first tower flange arranged at an upper end portion of a top part of a tower of the wind turbine using a plurality of rigid supports.

18 Claims, 6 Drawing Sheets (56) References Cited

U.S. PATENT DOCUMENTS

| | | | | |
|---|---|---|---|---|
| 2009/0142178 A1* | 6/2009 | Nieuwenhuizen | ...... | F03D 13/22 |
| | | | | 415/2.1 |
| 2012/0063915 A1* | 3/2012 | Kawabata | ............... | F03D 80/00 |
| | | | | 416/244 R |
| 2014/0301846 A1* | 10/2014 | Zhu | ......................... | F03D 80/00 |
| | | | | 416/146 R |
| 2021/0047998 A1 | 2/2021 | Mitsch | | |
| 2023/0220835 A1* | 7/2023 | Rieger | ................... | F03D 17/00 |
| | | | | 290/44 |

FOREIGN PATENT DOCUMENTS

| | | |
|---|---|---|
| EP | 2696072 A1 | 2/2014 |
| WO | WO2008000265 A1 | 1/2008 |
| WO | WO2014040598 A1 | 3/2014 |
| WO | WO2014165370 A1 | 10/2014 |

\* cited by examiner

WIND TURBINE HAVING EIGENFREQUENCY MODIFIER

FIELD

The present disclosure relates generally to wind turbines, and in particular to a wind turbine having an eigenfrequency modifier and a method of modifying an eigenfrequency of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Important fundamental vibrations of the wind turbine include natural bending modes of the tower and rotor components. The tower, nacelle, and rotor vibration modes may also interact or couple under certain conditions and cause an operational instability. Harmonic rotor loads that occur at multiples of the rotor speed can also excite the system's natural vibration modes. A fundamental system frequency that is driven by a harmonic rotor load is called a resonance condition. Potentially large structural displacements can result from a resonance condition. Thus, there is a problem of resonance condition in wind turbines.

BRIEF DESCRIPTION

In view of the above, a wind turbine having an eigenfrequency modifier and a method of modifying an eigenfrequency of a wind turbine is disclosed. Aspects and advantages will be set forth in part in the following description.

In one aspect, the present disclosure is directed to a wind turbine having a modified eigenfrequency, the wind turbine having a tower including a first tower flange arranged at an upper end portion of a top part of the tower; and, an eigenfrequency modifier including a plurality of weights suspended from the first tower flange by a plurality of rigid supports.

In another aspect, the present disclosure is directed to a method of modifying an eigenfrequency of a wind turbine, the method including modifying the eigenfrequency of the wind turbine by suspending a plurality of weights from a first tower flange arranged at an upper end portion of a top part of a tower of the wind turbine using a plurality of rigid supports.

These and other features, aspects and advantages of the present disclosure will become better understood with reference to the following description and appended claims. The accompanying drawings, which are incorporated in and constitute a part of this specification, illustrate the present disclosure and, together with the description, serve to explain the principles of the present disclosure.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

Figure 1:
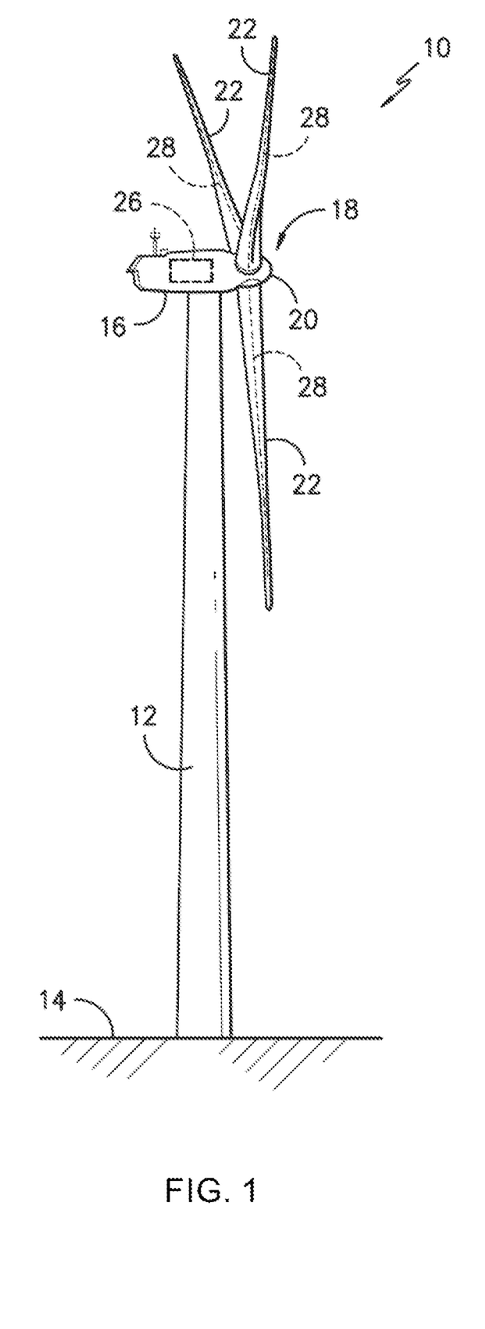
FIG. 1 is a perspective view of a wind turbine according to an embodiment of the present disclosure.

Referring now to the drawings, FIG. 1 shows a perspective view of a wind turbine according to the present disclosure. As shown, the wind turbine 10 generally includes a tower 12 extending from a support surface 14, a nacelle 16 mounted on the tower 12, and a rotor 18 coupled to the nacelle 16.

As shown in FIG. 1, the rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
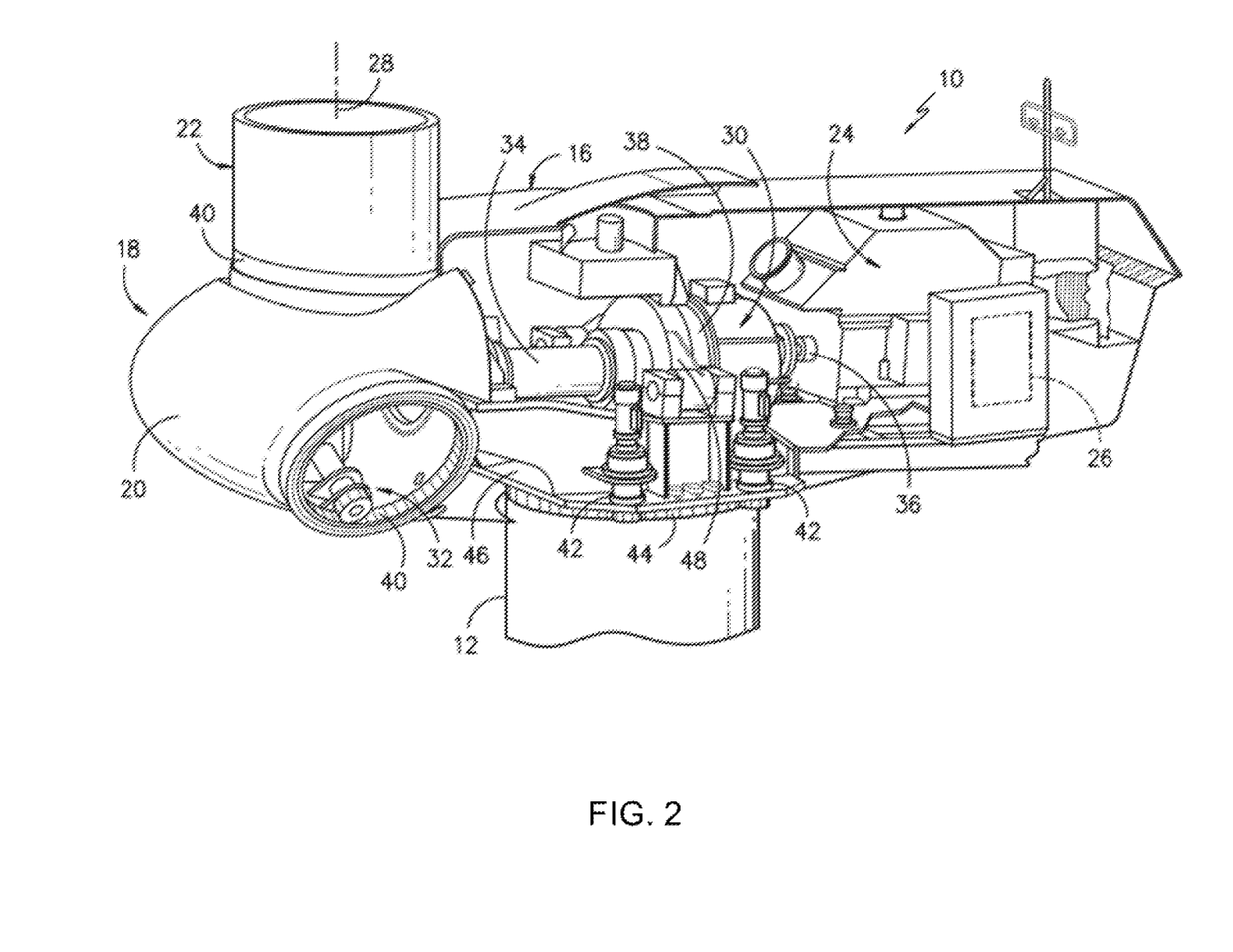
FIG. 2 is a simplified internal view of a nacelle of a wind turbine according to an embodiment of the present disclosure.

Referring now to FIG. 2, a simplified internal view of a nacelle 16 of a wind turbine 10, particularly illustrating the drivetrain components thereof, is shown. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30.

The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10). The yaw bearing 44 may be arranged on and/or supported by a first tower flange 530, e.g. arranged on and/or supported by a flange arranged at an upper end portion of a top part 510 of the tower 12.

As described, a resonance condition in wind turbines is undesirable. For example, a wind turbine having an excitation frequency (e.g. a rotor frequency, also referred to as 1P frequency; or a blade passing frequency, also referred to as 3P frequency) substantially coincident with a natural frequency of the wind turbine 10 (e.g. a first natural frequency or first eigenfrequency of the wind turbine) is undesirable. In particular, a wind turbine 10 having a first eigenfrequency not sufficiently separated from the rotor frequency of the wind turbine 10 is undesirable.

For example, when there is insufficient separation of the first eigenfrequency and the rotor frequency, the risk of turbine heavily oscillating may become unacceptable. In such a case, long-term fatigue damage, risk of immediate damage to the equipment, and to environment, e.g. in case of catastrophic failure, constitute undesirable consequences.

A wind turbine with an excitation frequency insufficiently separated from a natural frequency may occur despite the wind turbine being designed to have sufficient separation. For example, deviations may occur in top mass, e.g., due to vendor tolerances in components, and in foundation stiffness, e.g., due to site conditions.

In particular, deviations from design specifications may occur during manufacturing, e.g., due to vendor tolerances, during construction, e.g., because of variation in foundation stiffness, and even during operation during the wind turbine's lifetime, e.g., due to component replacements, weathering effects on foundation stiffness etc.

The embodiments described herein addresses the problem of insufficient separation between an excitation frequency and a natural frequency of a wind turbine 10 in an optimal manner. For example, a wind turbine 10 having an eigenfrequency modifier 350 including a plurality of weights 450 suspended, by a plurality of rigid supports 550, from a first tower flange 530 arranged at an upper end portion of a top part 510 of the tower 12 can be installed.

Accordingly, deviations arising from a variety of causes (vendor tolerances, foundation stiffness), at a variety of times (during manufacturing, construction, operation etc.), can be compensated and a separation of the natural frequency and an excitation frequency can be increased.

In particular, the weights being suspended from the first tower flange 530 is particularly effective because of the arrangement near the top of the tower 12. For example, the first tower flange 530 may be the flange on which the yaw bearing 44 is arranged. In a further example, the first tower flange 530 may be directly below the yaw bearing 44. Accordingly, the first tower flange 530 is in a relatively optimal position for affecting the natural frequency.

It may be understood that space is extremely limited within the nacelle and tower 12. Thus, an arrangement of suspending from the first tower flange 530 is particularly beneficial for minimizing interference with other equipment and access. Further, an arrangement of suspending from the first tower flange 530 is particularly beneficial because existing designs can easily incorporate a plurality of rigid supports 550 suspending weights from the first tower flange 530 with minimal, if any, modifications to the design.

According to an aspect, there is provided a wind turbine 10 having a modified eigenfrequency including a tower 12 including a first tower flange 530 arranged at an upper end portion of a top part 510 of the tower 12; and, an eigenfrequency modifier 350 including a plurality of weights 450 suspended from the first tower flange 530 by a plurality of rigid supports 550.

According to an embodiment, the plurality of rigid supports 550 includes at least a first rigid support and a second rigid support, the second rigid support arranged at a first circumferential distance apart from the first rigid support. According to an embodiment, each of the plurality of weights 450 is supported by at least two rigid supports of the plurality of rigid supports 550.

For example, the first rigid support and the second rigid support may be arranged at substantially the same radius from the axis of the tower 12. In an example, each of the plurality of weights 450 are annular sector shaped.

In particular, the first rigid support may include a first bar anchored to the first tower flange 530 at a first radius from the axis of the tower and at a first angular position. In particular, the second rigid support may include a second bar anchored to the first tower flange 530 at a second radius from the axis of the tower 12 and at a second angular position.

In particular, the first radius and the second radius may be substantially the same. In particular, the first angular position and the second angular position may be different. In particular, an embodiment formed by the combination of the described examples has the benefits described herein.

For example, the first angular position and the second angular position are at least 15 degrees apart or at least 30 degrees apart. For example, the first angular position and the second angular position are less than 90 degrees apart and/or less than 60 degrees apart. In particular, each of the plurality of weights 450 may have a width (in the circumferential direction) at least as wide as the spacing (in the circumferential direction) of the first rigid support and second rigid support.

A circumferential direction may be understood as in a direction parallel to a wall of the tower 12. Accordingly, large angle annular sector shaped weights can be provided, each being supported at, at least two, circumferentially spaced apart support points. Beneficially, such a mounting configuration allows limited tower space to be used efficiently.

According to an embodiment, each of the plurality of weights 450 has a width dimension or outer arc length dimension of at least 1%, at least 2.5%, or at least 5% of a circumference dimension of the tower 12. For example, each of the plurality of weights 450 is of an annular sector shape with an angular dimension of at least 3.6 degrees, at least 9 degrees, or at least 18 degrees. Beneficially, when an angular extent of each of the plurality of weights 450 is larger, less rigid supports and less support points are needed, and mounting requirements are eased.

According to an embodiment, each of the plurality of weights 450 has a width dimension or outer arc length dimension of at most 15%, at most 10%, or at most 7.5% of a circumference dimension of the tower 12. For example, each of the plurality of weights 450 is of an annular sector shape with an angular dimension of at most 54 degrees, at most 36 degrees or at most 27 degrees. Beneficially, when an angular extent of each of the plurality of weights 450 is smaller, handling requirements are eased, particularly during lifting and installation.

It is explicitly indicated that a plurality of combinations of numerical ranges are disclosed and provided herein, but not listed explicitly for sake of clarity. Each particular combination of numerical ranges provide corresponding effects. For example, each of the plurality of weights 450 may be of an annular sector shape with an angular dimension of at least 3.6 degrees, and at most 36 degrees. Beneficially, a corresponding balance of mounting requirements and handling requirements is provided.

In a particular example, the circumference dimension of the tower 12 may be a circumference dimension of the upper end portion of the top part 510 of the tower 12. A width dimension or outer arc length dimension of each of the plurality of weights 450 may be understood as a dimension substantially parallel to a tangent of the circumference of the tower 12 or to the circumference of the tower 12. Beneficially, limited space in the tower is used efficiently.

According to an embodiment, each of the plurality of weights 450 are arranged at most 100 mm, at most 50 mm, or at most 25 mm from an inside surface of the tower 12. For example, each of the plurality of weights 450 is arranged immediately adjacent to an inside surface of the tower 12. In particular, the inside surface of the tower 12 may be understood as an inside surface of the upper end portion of the top part 510 of the tower 12. Beneficially, limited space in the tower is used efficiently.

According to an embodiment, each of the plurality of weights 450 have a depth dimension of at most 1000 mm, at most 500 mm, or at most 250 mm. For example, each of the plurality of weights 450 has a depth dimension of at most 20% of a diameter of the tower 12, at most 10% of a diameter of the tower 12, or at most 5% of a diameter of the tower 12.

A depth dimension may be understood as a dimension substantially parallel to or collinear with the radius or diameter of the tower 12. A diameter of the tower 12 may be understood as a diameter of the upper end portion of the top part 510 of the tower 12.

Beneficially, limited space in the tower is used efficiently.

According to an embodiment, each of the plurality of weights 450 has a width dimension or outer arc length dimension to depth dimension of at least 2 to 1, at least 5 to 1, or at least 10 to 1. Beneficially, limited space in the tower is used efficiently.

According to an embodiment, each of the plurality of weights 450 has a mass of at most 200 kg, at most 100 kg or at most 50 kg. In an example, each of the plurality of weights 450 can be carried up the tower 12 by elevator. In an example, the elevator is inside the tower 12. Beneficially, handling is eased. Beneficially, the plurality of weights 450 can be better handled, particularly in the limited space within the tower.

In an example, the plurality of weights 450 are installed before installation of the nacelle, when the final mass of the nacelle and rotor assembly as installed is known. In another example, the plurality of weights 450 are installed after the installation of the nacelle, when the eigenfrequency of the wind turbine as installed is known or is measured. The eigenfrequency of the wind turbine may be measured after the installation or assembly of the entire wind turbine.

In an example, the plurality of weights 450 are lifted with a hoist inside the tower. In an example, the hoist may be an internal hoist. In an example, the plurality of weights 450 may be lifted one by one.

According to an embodiment, the plurality of weights 450 includes at least a first weight and a second weight arranged on top of the first weight. According to an embodiment, the first weight and second weight are suspended from the first tower flange 530 by the same rigid support or rigid supports.

For example, the first weight and the second weight may substantially overlap in a plane perpendicular to the axis of the tower 12.

In particular, each rigid support may include a bar extending in a direction parallel to gravity. In particular, the first weight and second weight may be arranged on top of each other along a bar of a respective rigid support along an axis parallel to gravity.

Accordingly, a stack of at least two weights can be supported by each mount. Beneficially, such a mounting configuration allows limited mounting points on the first tower flange 530 to be used efficiently.

According to an embodiment, dimensions and material of the plurality of weights 450 are standardized. For example, the plurality of weights 450 may have dimensions that are uniform between each weight or may have one of a predetermined set of dimensions. For example, each of the plurality of weights 450 is of the same material.

In particular, each of the plurality of weights 450 may have a first side with the same first radius of curvature and/or a second side with the same second radius of curvature. In particular, the first radius of curvature may be less than the second radius of curvature, and/or the second radius of curvature may be less than a radius of curvature of an interior surface of an upper end portion of the top part 510 the tower 12.

In particular, each of the plurality of weights 450 may have a third side and a fourth side, wherein the third side and fourth side are of the same dimensions. In particular, each of the plurality of weights 450 may have a first thickness, wherein the first thickness of each weight is one of a pre-determined set of thickness. In particular, each of the plurality of weights 450 may be of a metal, more particularly, of steel.

Accordingly, the numerous benefits afforded by pre-fabrication, universal compatibility, and mass-production are gained. Beneficially, eigenfrequency modifiers can be configured for a specific wind turbine extremely efficiently, at any time, e.g. during commissioning or during operation of the wind turbine 10.

Beneficially, eigenfrequency modifiers can be specifically configured for each individual wind turbine of a plurality of wind turbines extremely efficiently, at any time, e.g. during commissioning or during operation of each individual wind turbine of the plurality of wind turbines.

According to an embodiment, each of the plurality of rigid supports 550 includes a bar. According to an embodiment, each of the plurality of weights 450 includes a through-slot 470 adapted for receiving the bar. According to an embodiment, the through-slot 470 includes an open end adapted for receiving the bar.

For example, each of the plurality of rigid supports 550 includes a bar having a first diameter. For example, each of the plurality of weights 450 includes a through-slot 470 having a second diameter substantially equal to the first diameter.

In particular, the through-slot 470 may be open-ended on one side of the respective weight, thus allowing the bar to be accommodated in the through-slot 470 of the weight via the open-end of the through-slot 470.

Accordingly, each weight can be slotted onto the bar. Beneficially, the installation of many heavy weights is made straightforward, particularly in the limited space available inside the tower 12, and with minimal, if any, modifications to the design of the tower 12.

According to an embodiment, the plurality of weights 450 are suspended at least a first distance from the first tower flange 530. According to an embodiment, the first distance is sufficient for a torque tool to operate on the first tower flange 530. A torque tool may be a spanner and/or wrench.

For example, the first distance is sufficient for a torque tool to operate on a bolt connection 590 of the first tower flange 530. In particular, the bolt connection 590 may be a bolt connection 590 connecting the yaw bearing 44 to the first tower flange 530. The first distance may be understood as along a direction perpendicular to a bottom surface of the flange.

Accordingly, the first tower flange 530 is used as a mounting point for the plurality of weights 450 while maintaining the necessary access to the first tower flange 530. Beneficially, the limited space around the first tower flange 530 having existing access demands can be used without compromising access to flange, thus avoiding modifications to the design of the tower 12.

According to an embodiment, the eigenfrequency modifier 350 includes at least a first magnetic coupler 570 coupling a bottom end portion of each of the plurality of rigid supports 550 to the tower 12. Accordingly, vibration of the eigenfrequency modifier 350 is reduced and/or damped in a simple manner.

For example, vibration is damped without introducing complex coupling and tolerance considerations. In particular, the first magnetic coupler 570 may be fully compatible with any configuration, e.g. different amount of weights, required of the eigenfrequency modifier 350. Beneficially, vibration of an adaptable eigenfrequency modifier 350 is avoided, reduced and/or damped in a particularly simple manner.

According to an embodiment, the eigenfrequency modifier 350 includes a plurality of lateral supports 770. According to an embodiment, each of the plurality of lateral supports 770 protrudes from an interior side of the tower 12. According to an embodiment, each of the plurality of lateral supports 770 is arranged at a height position at least partially overlapping a height position of the plurality of weights 450.

For example, each of the plurality of lateral supports 770 is arranged adjacent to a lateral side of the plurality of weights 450. In particular, each of the plurality of lateral supports 770 may be a boss attached or welded to an interior side of the tower 12.

According to embodiments, each of the plurality of lateral supports 770 is arranged adjacent to the plurality of weights 450. In particular, each of the plurality of lateral supports 770 may be configured to constrain a lateral (and/or inward radial) movement of the plurality of weights 450.

In particular, each of the plurality of lateral supports 770 may be installed after the plurality of weights 450 are installed. In particular, each of the plurality of lateral supports 770 may be permanently attached to the tower 12, e.g. welded. In particular, each of the plurality of lateral supports 770 is configured for securing the plurality of weights 450 in an installed position.

Accordingly, lateral movement of the plurality of weights 450 suspended at a distance from the first tower flange 530 may be sufficiently constrained with minimal, if any, modifications to the design of the tower 12. Beneficially, a reliability of the suspension of weights at a distance from first tower flange 530 is ensured in a simple manner.

According to an embodiment, a density of each of the plurality of weights 450 is more than 2000 kg/m3. For example, a material of each of the plurality of weights 450 is concrete. According to an embodiment, a density of each of the plurality of weights 450 is more than 6000 kg/m3. For example, a material of each of the plurality of weights 450 is cast iron or a steel alloy.

Accordingly, the density as described achieves, in a particularly effective manner, a requisite separation of excitation frequency and natural frequency of the wind turbine. In particular, the density minimum as described is particularly significant considering the necessary masses, space limitation, and existing access considerations involved.

In an example, without particular limitation, for illustrative purpose, a top mass of a wind turbine 10 can be in the range of 250 to 300 tons. In the example, a large amount of weight is thus needed. For example, a mass of the weights may be of the order of a ton or of the order of 10 tons. For example, the weights may be at least 2 tons, at least 5 tons, or at least 10 tons.

In the example, the frequency separation between the rotor frequency and first eigenfrequency may be thus increased by about 1%. For example, the frequency separation may thus be increased from about 5% difference between the rotor frequency and first eigenfrequency to about 6% difference between the rotor frequency and first eigenfrequency.

Beneficially, weights having density minimum as described in examples herein allows limited space to be used efficiently.

According to an embodiment, a specified first eigenfrequency of the wind turbine 10 as designed is less than a rotor frequency or a blade passing frequency of the wind turbine. For example, a tower design of the wind turbine 10 is considered soft-soft.

It is understood that a tower design of a wind turbine 10 may be referred to as 'soft-soft' or 'soft-stiff' depending on the first eigenfrequency of the wind turbine 10 (or a natural frequency of a first mode of vibration of the wind turbine).

It is understood that a wind turbine of a 'soft-soft' tower design has a first eigenfrequency lower than a rotor frequency. It is understood that a wind turbine of a 'soft-stiff' tower design has a first eigenfrequency higher than a rotor frequency but lower than a blade passing frequency.

It can be understood that a rotor frequency is a frequency of the rotor of the wind turbine when operating at nominal speed.

It can be understood that a wind turbine having a 'soft-soft' tower design has a first eigenfrequency that coincides with an excitation of the rotor at some point between cut-in or start-up of the wind turbine but not when the wind turbine is operating at its rated RPM or nominal speed.

An eigenfrequency described herein can be understood as a first eigenfrequency or a first natural frequency of the wind turbine 10. Accordingly, the plurality of weights lowers the first eigenfrequency, thereby increasing the frequency separation of the first eigenfrequency and an excitation frequency. Beneficially, a frequency separation of an excitation frequency and natural frequency is increased.

According to an aspect, there is provided a method of modifying an eigenfrequency of a wind turbine comprising modifying the eigenfrequency of the wind turbine by suspending a plurality of weights from a first tower flange arranged at an upper end portion of a top part of a tower of the wind turbine using a plurality of rigid supports 860.

According to an embodiment, the method includes determining a mass of the plurality of weights during commissioning or operation of the wind turbine 940. Accordingly, deviations arising at a variety of times after the design phase, e.g., during manufacturing, construction, operation etc., is rectified. Beneficially, the problem of insufficient separation between an excitation frequency and a natural frequency of a wind turbine is addressed in an optimal manner, and an undesirably large safety margin or design tolerance in eigenfrequency separation can be avoided.

According to an embodiment, the method includes determining, based on a difference between a specified eigenfrequency of the wind turbine as designed and an eigenfrequency of the wind turbine as installed, an amount of the plurality of weights to be suspended 950. Accordingly, deviations arising from a variety of causes (vendor tolerances, foundation stiffness), is rectified.

Beneficially, the problem of insufficient separation between an excitation frequency and a natural frequency of a wind turbine is addressed in an optimal manner, and an undesirably large safety margin or design tolerance in eigenfrequency separation can be avoided.

According to an embodiment, the method includes, prior to suspending the plurality of weights, positively determining at least one of the following: (i) a tower top mass of the wind turbine is less than a specified lower limit of the tower top mass of the wind turbine 910; (ii) a stiffness of a foundation of the wind turbine is more than a specified upper limit of the stiffness of the foundation of the wind turbine 920; and, (iii) an eigenfrequency of the wind turbine is more than a specified upper limit of the eigenfrequency of the wind turbine 930.

The tower top mass may be understood as a top mass of the wind turbine.

In particular, the tower top mass of the wind turbine may be the actual tower top mass of the wind turbine. In an example, the tower top mass of the wind turbine is the tower top mass of the wind turbine as installed. In a further example, the tower top mass of the wind turbine is the in-field tower top mass of the wind turbine.

In an example, the tower top mass of the wind turbine is determined based on post-fabrication measurements. In a further example, the tower top mass of the wind turbine is determined based on in-field measurements.

The specified lower limit of the tower top mass of the wind turbine may be understood as a value lower than the tower top mass as designed. In an example, the specified lower limit of the tower top mass of the wind turbine may be a designed lower limit of the tower top mass.

In an example, the specified lower limit of the tower top mass of the wind turbine is a value that is 80%, 90% or 95% of the designed tower top mass.

In an example, the specified lower limit of the tower top mass of the wind turbine is a value that is 30 tons, 20 tons or 10 tons less than the designed tower top mass.

In particular, the stiffness of the foundation of the wind turbine may be the actual stiffness of the wind turbine. In an example, the stiffness of the foundation of the wind turbine is the stiffness of the foundation of the wind turbine as installed. In another example, the stiffness of the foundation of the wind turbine is the in-field stiffness of the foundation of the wind turbine.

In an example, the stiffness of the foundation of the wind turbine is determined based on post-construction measurements. In a further example, the stiffness of the foundation of the wind turbine is determined based on in-field measurements.

The specified upper limit of the stiffness of the foundation of the wind turbine may be understood as a value higher than the stiffness of the foundation as designed. In an example, the specified upper limit of the stiffness of the foundation of the wind turbine may be a designed upper limit of the stiffness of the foundation.

In an example, the specified upper limit of the stiffness of the foundation of the wind turbine is a value that is 10 times, 100 times or 1000 times of the designed stiffness of the foundation.

In an example, the specified upper limit of the stiffness of the foundation of the wind turbine is a value that is $10^8$ kNm/rad, $10^9$ kNm/rad or $10^{10}$ kNm/rad more than the designed stiffness of the foundation.

In a further example, the specified upper limit of the stiffness of the foundation of the wind turbine is a value that is $10^3$ kN/mm, $10^4$ kN/mm or $10^5$ kN/mm more than the designed stiffness of the foundation.

The eigenfrequency of the wind turbine may be understood as the first eigenfrequency of the wind turbine or as the natural frequency of the wind turbine.

In particular, the eigenfrequency of the wind turbine may be the actual eigenfrequency of the wind turbine. In an example, the eigenfrequency of the wind turbine is the eigenfrequency of the wind turbine as installed. In another example, the eigenfrequency ss of the wind turbine is the in-field eigenfrequency of the wind turbine.

In an example, the eigenfrequency of the wind turbine is determined based on post-assembly measurements or post-installation measurements. In a further example, the eigenfrequency of the wind turbine is determined based on in-field measurements.

The specified upper limit of the eigenfrequency of the wind turbine may be understood as a value higher than the eigenfrequency of the wind turbine as designed. In an example, the specified upper limit of the eigenfrequency of the wind turbine may be a designed upper limit of the eigenfrequency of the wind turbine.

In an example, the specified upper limit of the eigenfrequency of the wind turbine is a value that is 120%, 110% or 105% of the designed eigenfrequency.

In an example, the specified upper limit of the eigenfrequency of the wind turbine is a value that is 0.1 Hz, 0.01 Hz or 0.005 Hz more than the designed eigenfrequency.

The specified upper limit of the eigenfrequency of the wind turbine may be understood as a value that is equal to or less than the rotor frequency of the wind turbine.

In an example, the specified upper limit of the eigenfrequency of the wind turbine is a value that is 80%, 90% or 95% of the rotor frequency of the wind turbine.

In an example, the specified upper limit of the eigenfrequency of the wind turbine is a value that is 0.1 Hz, 0.01 Hz or 0.005 Hz less than the rotor frequency of the wind turbine.

Accordingly, the optimal conditions for applying the eigenfrequency modification is identified. Beneficially, the eigenfrequency modification is effectively applied.

According to an aspect, there is provided a method of customizing an eigenfrequency of each of a plurality of wind turbines in-field, including for each of the plurality of wind turbines 970, performing the method according to aspects or embodiments described herein.

Accordingly, an eigenfrequency of each of a plurality of wind turbines individually adapted according to a standardized method. Beneficially, deviations arising from a variety of causes and at a variety of times can be efficiently addressed.

Figure 3:
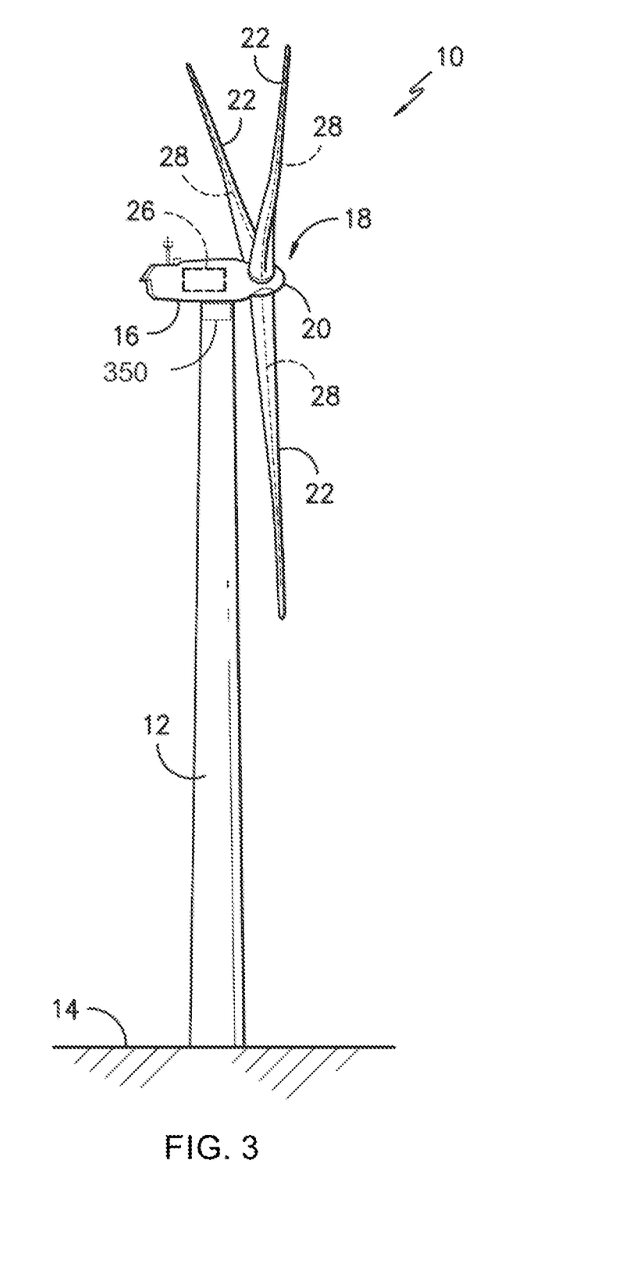
FIG. 3 is a simplified illustration of a wind turbine having an eigenfrequency modifier according to an embodiment of the present disclosure.

Referring now to FIG. 3, a schematic illustration of a wind turbine 10 having an eigenfrequency modifier 350 is shown. The eigenfrequency modifier 350 is illustrated within the tower 12.

Figure 4:
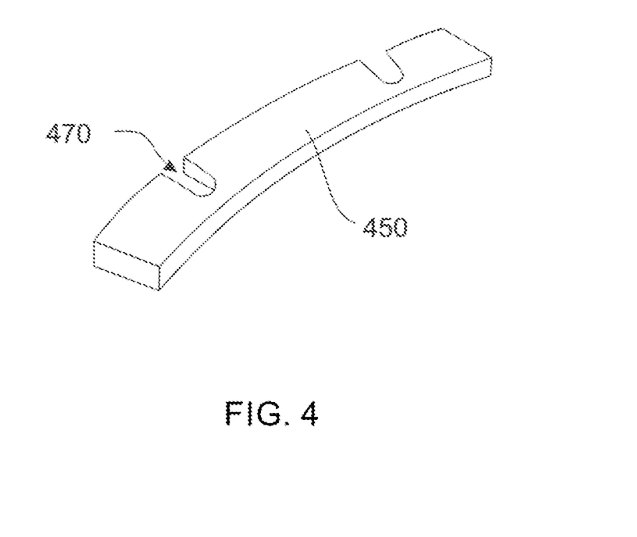
FIG. 4 is a simplified illustration of a weight of an eigenfrequency modifier according to an embodiment of the present disclosure.

Referring now to FIG. 4, one of a plurality of weights 450 is shown. The weight is illustrated to include a through-slot 470.

Figure 5:
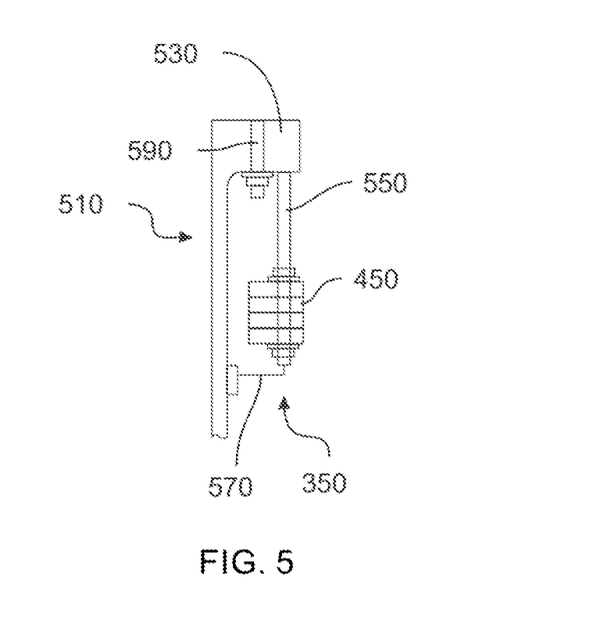
FIG. 5 is a simplified illustration of eigenfrequency modifier according to an embodiment of the present disclosure.

Referring now to FIG. 5, a simplified illustration of an eigenfrequency modifier 350 is shown. The eigenfrequency modifier 350 is illustrated to include a plurality of weights 450 suspended from the first tower flange 530 by a plurality of rigid supports 550. As illustrated, the eigenfrequency modifier 350 includes a first magnetic coupler 570. As illustrated, the first tower flange 530 is arranged at an upper end portion of a top part 510, and includes bolt connection 590.

Figure 6:
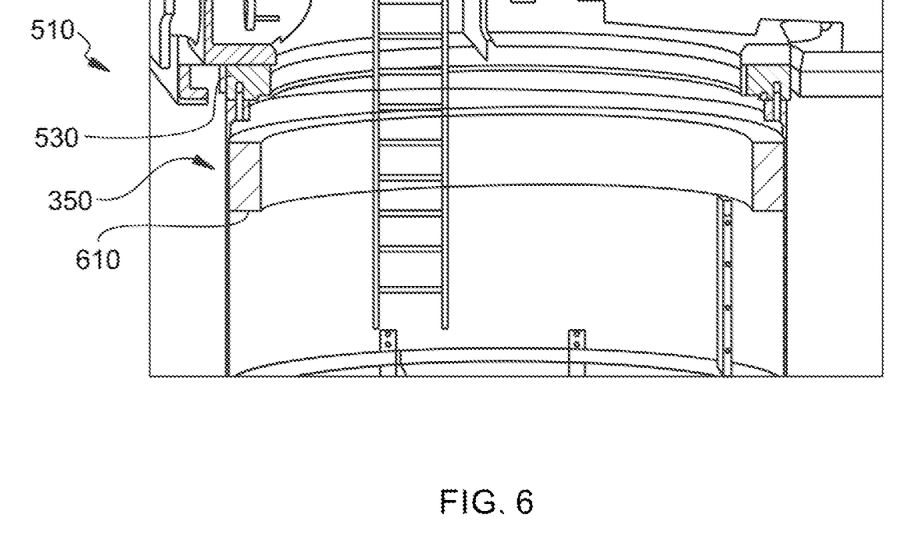
FIG. 6 is a cut-out view of a top part of a wind turbine tower according to an embodiment of the present disclosure.

Referring now to FIG. 6, a cut-out view of a top part 510 of a wind turbine tower is shown. A eigenfrequency modifier space 610 for the eigenfrequency modifier 350 is illustrated. The eigenfrequency modifier space 610 is illustrated below the first tower flange 530 and within a top part 510 of the tower 12.

The eigenfrequency modifier space 610 may be understood as a space where at least some (or all) of the plurality of weights 450 of the eigenfrequency modifier 350 may be arranged. It may be understood that each of the plurality of weights 450 has an angular dimension or angular extent of less than 360 degrees, for example, at most 54 degrees, at most 36 degrees or at most 27 degrees.

Figure 7:
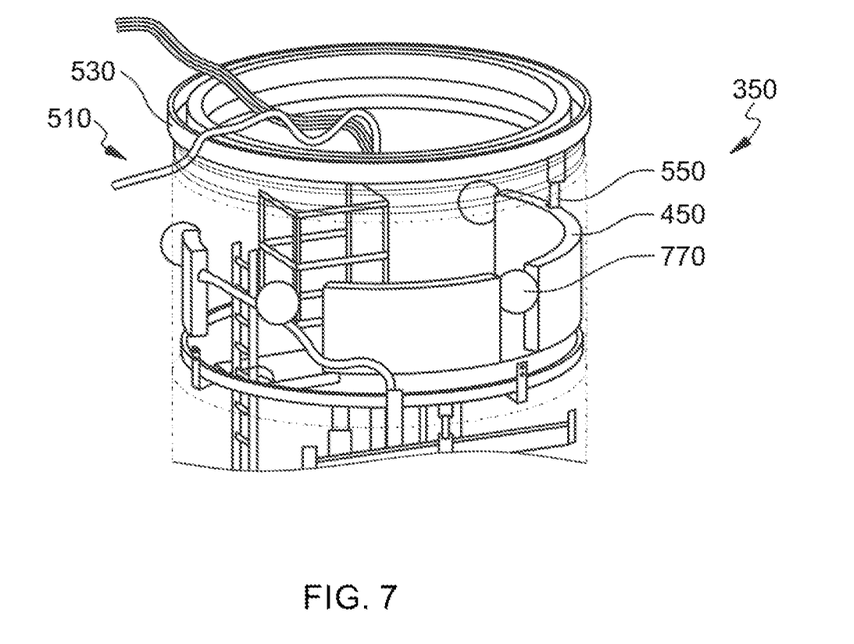
FIG. 7 is an internal view of top part of a wind turbine tower according to an embodiment of the present disclosure.

Referring now to FIG. 7, an internal view of top part 510 of a wind turbine tower 12 is shown. Illustrated is the eigenfrequency modifier 350 including a plurality of weights 450 suspended from the first tower flange 530 by a plurality of rigid supports 550. Further illustrated is the plurality of weights 450 being secured by a plurality of lateral supports 770.

Figure 8:
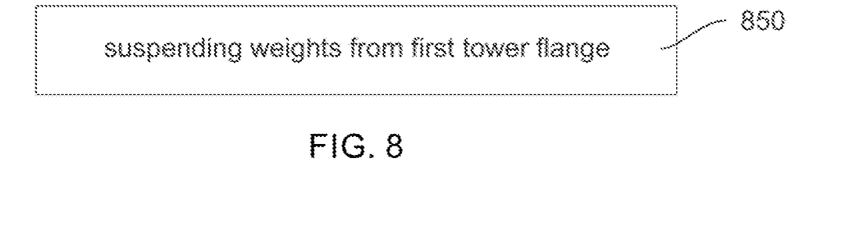
FIG. 8 is a schematic illustration of a method of modifying an eigenfrequency of a wind turbine according to an embodiment of the present disclosure.

Referring now to FIG. 8, a method of modifying an eigenfrequency of a wind turbine 860 is schematically illustrated. The method is illustrated to include suspending the weights from the first tower flange at the upper end portion of the top part of the tower 860.

Figure 9:
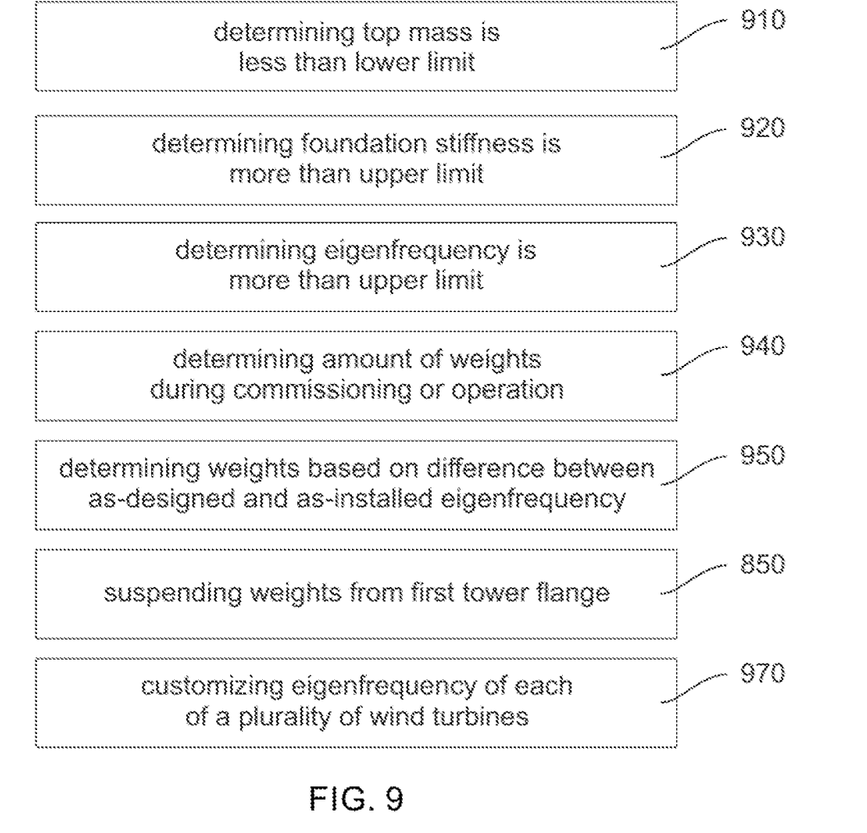
FIG. 9 is a schematic illustration of a method of modifying an eigenfrequency of a wind turbine according to an embodiment of the present disclosure.

Referring now to FIG. 9, a method of modifying an eigenfrequency of a wind turbine 910-970 is schematically illustrated. The method is illustrated to include at least one of, determining the top mass is less than a lower limit 910, determining the foundation stiffness is more than an upper limit 920, determining the eigenfrequency is more than the rotor frequency lower limit 930, determining the amount of weights during commissioning or operation of the wind turbine 940, determining the weights based on a difference between the as-designed and as-installed eigenfrequency 950, suspending the weights from the first tower flange at the upper end portion of the top part of the tower 860, and customizing an eigenfrequency of each of a plurality of wind turbines 970.

This written description uses examples to describe the present disclosure, including the best mode, and also to enable any person skilled in the art to practice the present disclosure, including making and using any devices or systems and performing any incorporated methods. The scope of the invention is defined by the claims.

The invention claimed is:

1. A wind turbine, comprising:
a tower;
a first tower flange arranged at an upper end portion of a top part of the tower;
an eigenfrequency modifier;
wherein the eigenfrequency modifier comprises a plurality of weights suspended from the first tower flange by a plurality of rigid supports such that the plurality of weights are adjacent to an inner wall of the tower;
the eigenfrequency modifier comprising a plurality of lateral supports that protrude from an interior side of the tower;
the lateral supports arranged at a height position at least partially overlapping a height position of the plurality of weights; and
each of the plurality of lateral supports arranged adjacent to the plurality of weights.

2. The wind turbine according to claim 1,
wherein the plurality of rigid supports comprises a first rigid support and a second rigid support, the second rigid support arranged at a first circumferential distance apart from the first rigid support; and,
wherein each of the plurality of weights is supported by at least two of the rigid supports.

3. The wind turbine according to claim 1,
wherein the plurality of weights includes a first weight and a second weight arranged on top of the first weight; and
wherein the first weight and second weight are suspended from the first tower flange by a same one or ones of the rigid supports.

4. The wind turbine according to claim 1, wherein the plurality of weights have standardized dimensions and material.

5. The wind turbine according to claim 1, wherein:
each of the plurality of rigid supports includes a bar;
each of the plurality of weights includes a through-slot adapted for receiving the bar; and
the through-slot includes an open end adapted for receiving the bar.

6. The wind turbine according to claim 1, wherein the plurality of weights are suspended at a first distance from the first tower flange that is sufficient for a torque tool to operate on the first tower flange.

7. The wind turbine according to claim 1, wherein a density of each of the plurality of weights is more than 2000 kg/m3.

8. The wind turbine according to claim 1, wherein a specified first eigenfrequency of the wind turbine is less than a rotor frequency or a blade passing frequency of the wind turbine.

9. The wind turbine according to claim 1, wherein the plurality of weights comprise an outer arc-shaped side that is spaced from and parallel to a circumference dimension of the inner wall of the tower; and wherein the outer arc-shaped side comprises an arc length dimension between 1% and 15% of and parallel to the circumference dimension of the inner wall of the tower, and an arc length dimension to depth dimension ratio of at least 2 to 1.

10. The wind turbine according to claim 1, wherein the eigenfrequency modifier comprises a first magnetic coupler coupling a bottom end portion of each of the plurality of rigid supports to the tower.

11. A wind turbine, comprising:
a tower;
a first tower flange arranged at an upper end portion of a top part of the tower;
an eigenfrequency modifier;
wherein the eigenfrequency modifier comprises a plurality of weights suspended from the first tower flange by a plurality of rigid supports; and
wherein the eigenfrequency modifier comprises a first magnetic coupler coupling a bottom end portion of each of the plurality of rigid supports to the tower.

12. A method of modifying an eigenfrequency of a wind turbine, the method comprising:
suspending a plurality of weights from a first tower flange arranged at an upper end portion of a top part of a tower of the wind turbine using a plurality of rigid supports such that the plurality of weights are adjacent to an inner wall of the tower;
providing a plurality of lateral supports that protrude from an interior side of the tower, the lateral supports arranged at a height position at least partially overlapping a height position of the plurality of weights; and
arranging each of the plurality of lateral supports adjacent to the plurality of weights.

13. The method according to claim 12, further comprising determining an amount of the plurality of weights during commissioning or operation of the wind turbine.

14. The method according to claim 12, further comprising determining, based on a difference between a specified eigenfrequency of the wind turbine as designed and an eigenfrequency of the wind turbine as installed, an amount of the plurality of weights to be suspended.

15. The method according to claim 12, further comprising, prior to suspending the plurality of weights, determining at least one of the following:
a tower top mass of the wind turbine is less than a specified lower limit of the tower top mass of the wind turbine;
a stiffness of a foundation of the wind turbine is more than a specified upper limit of the stiffness of the foundation of the wind turbine; and,
an eigenfrequency of the wind turbine is more than a specified upper limit of the eigenfrequency of the wind turbine.

16. The method according to claim 12, wherein the wind turbine is one of a plurality of in-field wind turbines and the method is performed on the plurality of in-field wind turbines.

17. The method according to claim 12, wherein the plurality of weights have an outer arc-shaped side that is spaced from and parallel to a circumference dimension of the inner wall of the tower, the outer arc-shaped side comprising an arc length dimension between 1% and 15% of and parallel to the circumference dimension of the inner wall of the tower, and an arc length dimension to depth dimension ratio of at least 2 to 1.

18. The method according to claim 12, further comprising configuring a first magnetic coupler to couple a bottom end portion of each of the plurality of rigid supports to the tower.

* * * * *